219-121
8/25/87 OR 4,689,468
SR

United States Patent [19] | [11] Patent Number: 4,689,468
Muehlberger | [45] Date of Patent: Aug. 25, 1987

[54] METHOD OF AND APPARATUS PROVIDING OXIDE REDUCTION IN A PLASMA ENVIRONMENT

[75] Inventor: Erich Muehlberger, San Clemente, Calif.

[73] Assignee: Electro-Plasma, Inc., Irvine, Calif.

[21] Appl. No.: 827,726

[22] Filed: Feb. 10, 1986

[51] Int. Cl.[4] .............................................. B23K 15/00

[52] U.S. Cl. ....................... 219/121 PL; 219/121 PR; 219/76.16; 427/34

[58] Field of Search ....... 219/121 PL, 76.16, 121 PR, 219/121 PM, 121 P, 74, 75, 137 R; 313/231.31, 231.41, 231.51; 427/34

[56] References Cited

U.S. PATENT DOCUMENTS 4,119,828 10/1978 Bykhovsky et al. ......... 219/121 PR
4,233,489 11/1980 Essers .............................. 219/76.16

FOREIGN PATENT DOCUMENTS 1440974 6/1976 United Kingdom ............ 219/76.16

*Primary Examiner*—M. H. Paschall
*Attorney, Agent, or Firm*—Bogucki, Scherlacher, Mok & Roth

[57] ABSTRACT

In a plasma spraying system in which a main plasma gun electrically coupled to a workpiece or target and equipped with apparatus for introducing a spray powder therein provides a plasma stream to the target at high temperatures and supersonic speeds with an accompanying transfer arc between the main plasma gun and the target in a given polarity relative to the target, apparatus is present for simultaneously providing a second transfer arc at the target which has an opposite polarity relative to the target from the polarity of the transfer arc provided by the main plasma gun. The second transfer arc which is provided by a separate second or clean-up plasma gun electrically coupled to the target acts to reduce oxides at the target during melting of the target, spraying of the target with metallic powders and other plasma operations. The transfer arcs are provided by the main and clean-up plasma guns in conjunction with direct current power supplies coupled between the target and the guns so as to render the target positive with respect to one of the plasma guns and negative with respect to the other plasma gun. Additional direct current power supplies coupled to the main and clean-up plasma guns provide the plasma guns with pilot arcs.

13 Claims, 3 Drawing Figures

METHOD OF AND APPARATUS PROVIDING OXIDE REDUCTION IN A PLASMA ENVIRONMENT

BACKGROUND OF THE INVENTION

1. Field of the Invention

The present invention relates to plasma systems, and more particularly to systems in which a transfer arc is created between a plasma gun and a target in an inert atmosphere under conditions of high temperature and supersonic speeds to accomplish various tasks at the target including the deposition of a coating of material introduced at the plasma gun.

2. History of the Prior Art

It is known in the art to have a plasma system in which a plasma gun in combination with a power supply provides a transfer arc in the form of a flame of ionized gas between the gun and a workpiece or other target. The plasma gun is typically mounted within a closed container together with the target, and may be coupled to a scanning mechanism so as to direct a plasma stream onto various different portions of the target. The plasma stream acts as a conductor for ionized inert gas introduced at high temperature and which may flow through the closed container at supersonic speeds such as Mach 2 or Mach 3 in conjunction with a vacuum system coupled to the closed container to provide a transfer arc. In this manner powdered metals and similar materials introduced at the plasma gun are entrained into the plasma stream for deposition on the target. Other functions can also be achieved with such arrangements such as the melting of a member coupled as the workpiece or target and the making of metallic powders.

A common problem with plasma systems is the formation of oxides at the workpiece or target in conjunction with powder spraying, melting and other common operations. In spite of the use of a relatively pure inert gas in the formation of the transfer arc and in spite of the supersonic speeds at which the plasma stream travels, oxides still form at the workpiece or target.

Various arrangements and schemes have been devised in an attempt to remove oxides from the workpiece or target. One such arrangement which has been found to be particularly effective is described in U.S. Pat. No. 4,328,257 of Muehlberger et al which issued May 4, 1982 and which is commonly assigned with the present application. The Muehlberger et al patent describes a plasma system which includes a switching arrangement in conjunction with a direct current power supply coupled between the plasma gun and the workpiece or target so that the workpiece can be made cathodic relative to the plasma gun to create a reverse transfer arc at predetermined intervals. This creates a sputtering effect in which electrons and atoms are ejected from the workpiece despite the impacting plasma flow and the ambient pressure level. The workpiece can be rapidly heated to a working temperature, with or without a transfer arc, cleaned by the removal of atoms from the workpiece at a controlled rate during reversal of the transfer arc for a predetermined interval, and then coated, with or without an overlap between the coating and the sputtering intervals. Coating may then be completed using the transfer arc if desired.

The plasma arrangement described in U.S. Pat. No. 4,328,257 of Muehlberger et al has been found to be very effective in removing oxides from a workpiece or target and from coatings sprayed onto the workpiece or target so that a strong, well bonded coating of relatively pure material results. However, alternative arrangements and techniques for accomplishing this result would be advantageous, including in particular the ability to reduce the formation of oxides in the first instance or at least to prevent oxides which are formed from becoming a part of the workpiece or target.

Accordingly, it is an object of the invention to provide an arrangement for reducing oxides at a workpiece or target in a plasma system.

It is a further object of the invention to provide an arrangement for removing oxides as they form at a workpiece or target during melting of the target, spraying of powdered metal on the target or other operation in a plasma system.

BRIEF SUMMARY OF THE INVENTION

Plasma systems in accordance with the invention create a separate second transfer arc at the workpiece or target simultaneously with the main transfer arc which occurs at the target in conjunction with the use of a plasma gun to direct a plasma onto the target. The separate second transfer arc which is of polarity opposite the polarity of the main transfer arc relative to the target acts to retard the formation of oxides in the region of the target and to carry away those oxides which are formed so that such oxides do not remain with the target. The transfer arcs of opposite polarity relative to the target are created by an electrical arrangement which provides the target with one polarity relative to the plasma gun and an opposite polarity relative to the source of the separate second transfer arc.

In a preferred arrangement of a plasma system in accordance with the invention a main plasma gun directs a plasma stream onto a target and is equipped with apparatus for feeding metallic powders or the like into the plasma stream. A first transfer arc of given polarity is provided between the main plasma gun and the target by a first direct current power supply coupled between the target and the main plasma gun in conjunction with an inert gas which is ionized and moved past the target at high speed. A second transfer arc having a polarity opposite the polarity of the first transfer arc at the target is provided by a clean-up plasma gun coupled to the target by a second direct current power supply. The first and second power supplies are arranged so as to provide the target with one polarity relative to one of the plasma guns and an opposite polarity with respect to the other one of the plasma guns. This provides two electron flows between the two plasma guns and the target. The electron flows are in opposite directions relative to the target. Third and fourth direct current power supplies may be coupled to the main plasma gun and the clean-up plasma gun respectively to provide each of the guns with a pilot arc.

In a specific example of a plasma system in accordance with the invention having main and clean-up plasma guns directed toward a common target, the main plasma gun has a cathode coupled through a first direct current power supply to the target. The polarity of the first direct current power supply renders the target positive relative to the cathode of the main plasma gun. The clean-up plasma gun has an anode coupled to the target through a second direct current power supply. The polarity of the second direct current power supply renders the target negative relative to the anode of the clean-up plasma gun. A third direct current power supply is coupled between the cathode and an anode of the main plasma gun to provide the main plasma gun with a pilot arc. A fourth direct current power supply is coupled between the cathode of the clean-up plasma gun and an anode of such gun to provide the clean-up plasma gun with a pilot arc. The first direct current power supply coupled between the cathode of the main plasma gun and the target is of considerably greater power than the third direct current power supply coupled between the cathode and the anode of the main plasma gun. This tends to concentrate much of the working action of the main plasma gun in the region of the target with the result that substantial and intensive plasma activity may take place at the target. At the same time the second electron flow provided by the clean-up plasma gun acts to greatly reduce oxides at the target.

BRIEF DESCRIPTION OF THE DRAWINGS

A better understanding of the invention may be had by reference to the following specification in conjunction with the accompanying drawings, in which.

DETAILED DESCRIPTION

Figure 1:
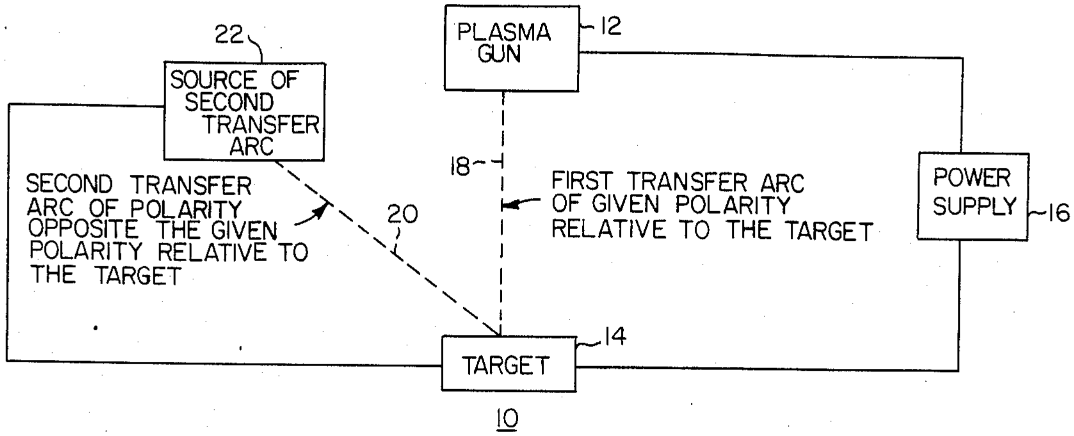
FIG. 1 is a block diagram of a plasma system in accordance with the invention.

FIG. 1 depicts a plasma system 10 in accordance with the invention in its basic essence. The plasma system 10 includes a plasma gun 12 and a target 14. A power supply 16 is coupled between the plasma gun 12 and the target 14 to provide a potential difference between.

The plasma gun 12 which is of conventional design provides ion formation and a corresponding electron flow between the gun 12 and the target 14. This beam or plasma stream between the plasma gun 12 and the target 14 acts as a conductor which may be used in establishing a transfer arc and in spraying metallic and nonmetallic materials in powder or other form on the target 14. With an inert gas such as argon present in the region of the plasma gun 12, ionization of the gas occurs as a result of the plasma gun 12 so as to produce a flame. This flame is given direction by the power supply 16 which causes the flame to provide a transfer arc between the plasma gun 12 and the target 14. The transfer arc has a direction between the plasma gun 12 and the target 14 and thus a polarity relative to the target 14 which is determined by the power supply 16. This first transfer arc which is considered to have given polarity as determined by the power supply 16 is represented by a dotted line 18 in FIG. 1.

The plasma gun 12 and the target 14 are preferably located within a closed chamber containing an inert atmosphere as described in detail hereafter. A high temperature environment combined with high plasma velocity of up to supersonic speeds and greater can be provided by a vacuum source, enabling the first transfer arc 18 to function in various different ways at the target 14. For example the first transfer arc 18 can be used to heat a workpiece comprising the target 14. The plasma gun 12 is provided with apparatus for introducing metallic powders and the like into the plasma stream, in which event the first transfer arc 18 provides coating of the metallic powder on the target 14. Also, the system 10 can be used to create metallic powders at the target 14 as well as to perform other plasma functions.

As the various functions are performed by the first transfer arc 18 at the target 14, oxides which result therefrom would normally be deposited in the target 14. In spite of the presence of an inert atmosphere, such oxides nevertheless form. Where the first transfer arc 18 is being used to heat the target 14, the oxides which form are from the metal comprising the target 14. Where metallic material in powder or other form is being sprayed onto the target 14 by the first transfer arc 18, the oxides may be from both the material being sprayed and the material of the target 14. Such oxides constitute an impurity within the target 14 which is undesirable.

In accordance with the invention oxides at the target 14 are greatly reduced by providing a second transfer arc at the target 14 simultaneously with the first transfer arc 18. The second transfer arc which is represented by a dotted line 20 in FIG. 1 and which has a polarity opposite the given polarity of the first transfer arc relative to the target 14 is provided by a source 22 which is electrically coupled to the target 14. As previously noted the first transfer arc 18 is provided by an electron flow between the plasma gun 12 and the target 14. The second transfer arc 20 is also provided by an electron flow between the source 22 and the target 14, which electron flow is in a direction opposite the direction of the electron flow between the plasma gun 12 and the target 14. Thus, if the electron flow of the first transfer arc 18 is in a direction into a target 14 from the plasma gun 12, then the electron flow of the second transfer arc 20 is in a direction out of the target 14 and toward the source 22. Conversely, if the direction of the electron flow of the first transfer arc 18 is out of the target 14 and toward the plasma gun 12, then the electron flow of the second transfer arc 20 is into the target 14 from the source 22. While the first transfer arc 18 is functioning to melt the target 14 or to melt materials being deposited on the target 14, the secnd transfer arc 20 is functioning to clean the target 14 by removing oxides as they form at the target 14. The result is a target 14 with very little in the way of oxides due to the plasma process of the system 10.

Figure 2:
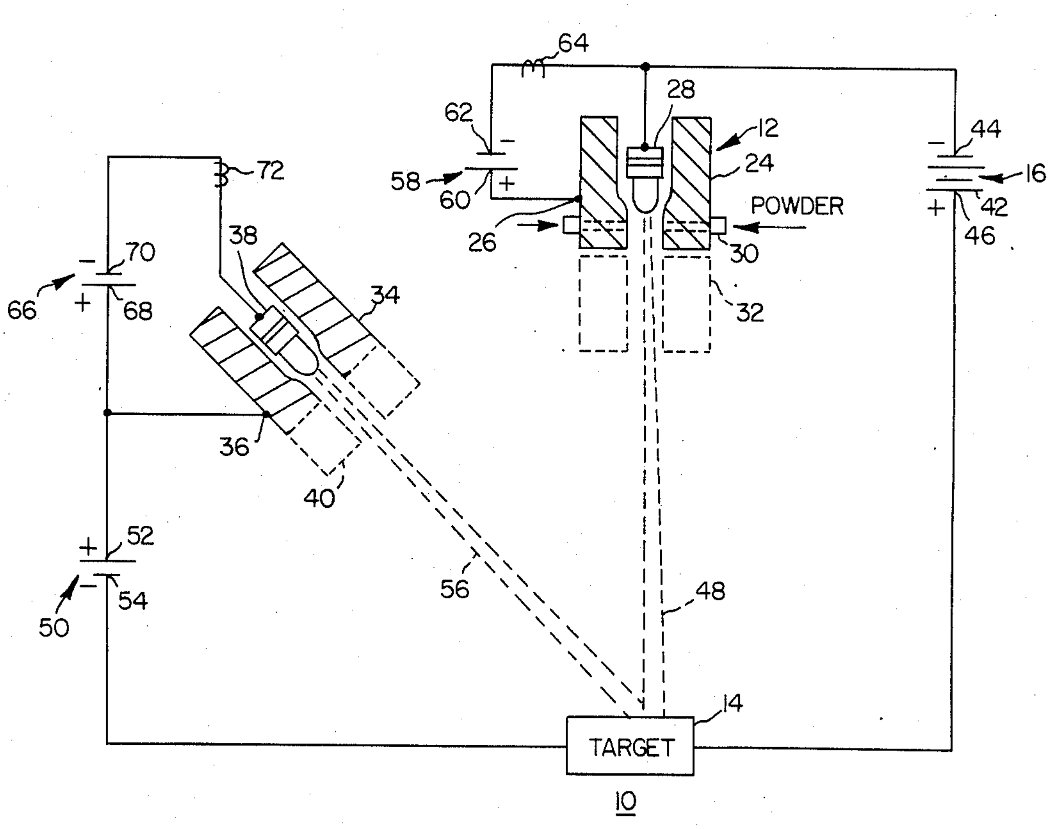
FIG. 2 is a schematic diagram of an embodiment of a plasma system in accordance with the arrangement of FIG. 1.

A preferred embodiment of the plasma system 10 of FIG. 1 is shown in somewhat greater detail in FIG. 2. As shown in FIG. 2 the plasma gun 12 comprises a main power gun 24 having an anode 26 and a cathode 28. The main power gun 24 is also provided with powder feeding apparatus 30, and is outfitted with an confinement coil 32 which is shown in dotted outline in Fig. 2. The source 22 of the second transfer arc 20 includes a clean-up gun 34 having an anode 36, a cathode 38 and a confinement coil 40 which is shown in dotted outline in FIG. 2.

As noted in connection with FIG. 1 the power supply 16 couples the plasma gun 12 to the target 14. In the example of FIG. 2 the power supply 16 comprises a first power supply 42 in the form of a D.C. power source of 120 kilowatts and 160 volts having a negative terminal 44 thereof coupled to the cathode 28 and a positive terminal 46 thereof coupled to the target 14. The first power supply 42 renders the target 14 positive relative to the main power gun 24 so that an electron flow is in the direction from the main power gun 24 to the target 14. The first transfer arc which is represented by a flame 48 extending between the cathode 28 of the main power gun 24 and the target 14 is comprised of an ion flow in a direction opposite the electron flow or from the target 14 to the cathode 28 of the main power gun 24.

The clean-up gun 34 is coupled to the target 14 by a second power supply 50. In the present example the second power supply 50 comprises a D.C. power source of 20 kilowatts and 140 volts having a positive terminal 52 coupled to the anode 36 of the clean-up gun 34 and a negative terminal 54 coupled to the target 14. This renders the target 14 negative relative to the clean-up gun 34. As a result there is an electron flow from the target 14 to the cathode 38 of the clean-up gun 34. The second transfer arc which is represented by a flame 56 in FIG. 2 is comprised of an opposite ion flow which is in a direction into the target 14 from the cathode 38 of the clean-up gun 34.

A third power supply 58 is coupled between the anode 26 and the cathode 28 of the main power gun 24 to provide the main gun 24 with a pilot arc. In the example of FIG. 2 the third power supply 58 comprises a D.C. power source of 20 kilowatts and 140 volts having a positive terminal 60 coupled to the anode 26 of the main power gun 24 and a negative terminal 62 coupled to the cathode 28 of the main power gun 24. A coil 64 coupled between the negative terminal 62 and the cathode 28 functions as a high frequency starter.

A fourth power supply 66 is coupled between the anode 36 and the cathode 38 of the clean-up gun 34. In the example of FIG. 2 the fourth power supply 66 comprises a D.C. power source of 20 kilowatts and 140 volts having a positive terminal 68 coupled to the anode 36 of the clean-up gun 34 and a negative terminal 70 coupled to the cathode 38 of the clean-up gun 34. A coil 72 coupled between the negative terminal 70 and the cathode 38 functions as a high frequency starter for the clean-up gun 34. The fourth power supply 66 provides the clean-up gun 34 with a pilot arc.

The two flames 48 and 56 between the guns 24 and 34 and the target 14 act like conductors of variable resistance for the ion flows which comprise the first and second transfer arcs 18 and 20. The transfer arcs 18 and 20 can be of either polarity so long as they are of opposite polarity relative to the target 14. In this manner the second transfer arc 20 provides continuous cleaning action by removal of oxides as they form at the target 14 while the first transfer arc 18 provides a basic function at the target 14 such as melting, powder deposition and the like.

Figure 3:
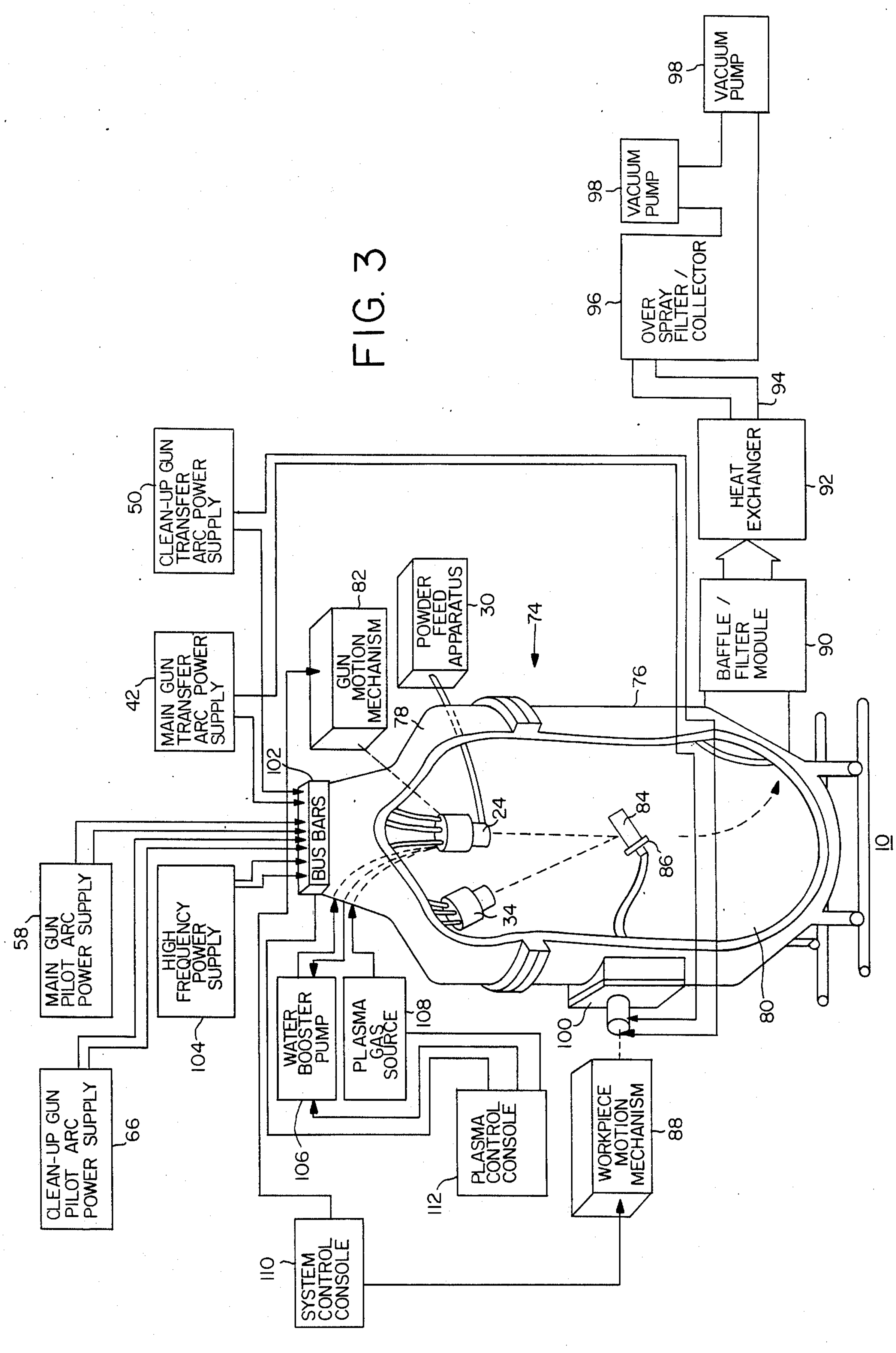
FIG. 3 is a combined block diagram and perspective view, partially broken away, of a specific example of the embodiment fo FIG. 2.

A detailed example of the embodiment of the plasma system 10 of FIG. 2 is shown in FIG. 3. As shown therein the plasma system 10 includes a plasma chamber 74 that provides a sealed vacuum-maintaining and pressure-resistant insulative enclosure. The chamber 74 is defined by a cylindrical principal body 76, and an upper lid 78 joined thereto. The body 76 of the plasma chamber 74 includes a bottom collector cone 80 that leads into and communicates with associated units for processing the exiting gases and particulates and maintaining the desired ambient pressure. A downwardly directed plasma stream is established by the main power gun 24 mounted within the interior of the chamber lid 78, the position of which gun 24 is controlled by a plasma gun motion mechanism 82. Both parts of the plasma chamber 74 are advantageously constructed as double walled, water cooled enclosures and the lid 78 is removable for access to the operative parts. The gun motion mechanism 82 supports and controls the main power gun 24 through sealed bearings and couplings in the walls of the chamber lid 78. The powder feed apparatus 30 is also coupled to the chamber lid 78 and provides controlled feed of a heated powder into the plasma stream through flexible tubes that are coupled to the main power gun 24 at the plasma exit region.

The target 14 of the arranements of FIGS. 1 and 2 comprises a workpiece 84 located beneath the main power gun 24 and supported on an internally cooled conductive workpiece sting or holder 86 and positioned and moved while in operation by a shaft extending through the chamber body 76 to an exterior workpiece motion mechanism 88.

Below the workpiece 84, the collector cone 80 directs the overspray gaseous and particulate materials into a baffle/filter module 90 having a water cooled baffle section for initially cooling the overspray, and an in-line filter section for extracting the majority of the entraned particle matter. Effulent passing through the baffle/filter module 90 is then directed through a heat exchanger module 92, which may be another water cooled unit, into a vacuum manifold 94 containing an overspray filter/collector unit 96 which extracts substantially all particulate remaining in the flow. The vacuum manifold 94 communicates with vacuum pumps 98 having sufficient capacity to maintain a desired ambient pressure within the chamber 74. Typically, the ambient pressure is in the range from 0.6 down to 0.001 atmospheres. The baffle/filter module 90 and the heat exchanger module 92, as well as the overspray filter/collector unit 96 are preferably double-wall, water-cooled systems, and any of the types well known and widely used in plasma systems may be employed.

The entire system may be mounted on rollers and movable along rails for ease of handling and servicing of different parts of the system. Conventional viewing windows, water cooled access doors and insulated feed through plates for electrical connection have not been shown or discussed in detail for simplicity. However, the workpiece support and motion control system is advantageously mounted in a hinged front access door 100 in the chamber body 76.

Electrical energy is supported into the operative portions of the system by affixed bus bars 102 mounted on the top of the chamber lid 78. Flexible water cooled cables couple external plasma power supplies and a high frequency power supply 104 via the bus bars 102 into the main power gun 24 and the clean-up gun 34 for generation of the plasma streams. The external plasma power supplies include the first power supply 42, the second power supply 50, the third power supply 58 and the fourth power supply 66 described in FIG. 2. The first power supply 42 comprises a transfer arc power supply for the main power gun 24. The second power supply 50 comprises a transfer arc power supply for the clean-up gun 34. The third power supply 58 comprises a pilot arc power supply for the main power gun 24. The fourth power supply 66 comprises a pilot arc power supply for the clean-up gun 34. In the present example the high frequency power supply 104 initiates the transfer arcs at the main power gun 24 and the clean-up gun 34 by superimposing a high frequency voltage discharge on the D.C. power supplies in well known fashion.

Operation of the main power gun 24 and the clean-up gun 34 entails usage of a water booster pump 106 to provide an adequate flow of cooling water through the interiors of the plasma guns 24 and 34. A plasma gas source 108 provides a suitable ionizing gas for generation of the plasma streams at the plasma guns 24 and 34. The plasma gas typically employed is either argon alone or argon seeded with helium or hydrogen, although other gases may be employed as is well known to those skilled in the art. Control of the sequencing of the plasma system 10, and the velocity and amplitude of motion of the various motion mechanisms, is governed by a system control console 110. The plasma guns 24 and 34 are seperately operated under control of a plasma control console 112. Many of the components of FIG. 3 are of conventional design and are shown and described in greater detail in the previously referred to U.S. Pat. No. 4,328,257 of Muehlberger et al.

While the invention has been particularly shown and described with reference to a preferred embodiment thereof, it will be understood by those skilled in the art that various changes in form and details may be made therein without departing from the spirit and scope of the invention.

What is claimed is:

1. A plasma system comprising the combination of:
a plasma gun positioned in operative relation to a workpiece, aimed to intersect the workpiece with a plasma stream axis thereof and providing a plasma stream between the plasma gun and the workpiece along the plasma stream axis;
means for providing a first transfer arc between the plasma gun and the workpiece along the plasma stream axis and having a given polarity relative to the workpiece; and
means for providing a second transfer arc at the workpiece simultaneously with the first transfer arc, the second transfer arc having an axis which generally intersects with the plasma stream axis at the workpiece and a polarity opposite the given polarity relative to the workpiece.

2. The invention set forth in claim 1, further including means for injecting spray material into the plasma stream for deposition on the workpiece, the first transfer arc occurring in conjunction with the plasma stream to provide for deposition of the spary material on the workpiece and the second transfer arc being operative to carry away oxides of the spray material formed at the workpiece.

3. The invention set forth in claim 1, wherein the means for providing a second transfer arc includes a second plasma gun electrically coupled to the workpiece.

4. A plasma system comprising the combination of a first plasma gun positioned in operative relation to a workpiece, aimed to intersect the workpiece with a plasma stream axis thereof and capable of providing a plasma stream including an injected spray material to the workpiece along the plasma stream axis, a first power supply coupling the first plasma gun to the workpiece and providing the workpiece with a first polarity relative to the first plasma gun, a second plasma gun positioned in operative relation to the workpiece and aimed so that a plasma stream axis thereof generally intersects with the plasma stream axis of the first plasma gun at the workpiece, and a second power supply coupling the second plasma gun to the workpiece and providing the workpiece with a second polarity relative to the second plasma gun, the second polarity being opposite the first polarity.

5. The invention set forth in claim 4, wherein the first power supply comprises a D.C. power supply having a positive terminal coupled to the workpiece and a negative terminal coupled to the first plasma gun and the second power supply comprises a D.C. power supply having a negative terminal coupled to the workpiece and a positive terminal coupled to the second plasma gun.

6. The invention set forth in claim 4, further comprising a third power supply coupled to provide the first plasma gun with a pilot arc and a fourth power supply coupled to provide the second plasma gun with a pilot arc.

7. A plasma system comprising the combination of:
a main plasma gun having material injecting apparatus associated therewith;
a target;
means for providing a transfer arc between the main plasma gun and a given location on the target in a given polarity relative to the target;
a clean-up plasma gun; and
means for providing a transfer arc between the clean-up plasma gun and the target approximately at the given location on the target and in a polarity opposite the given direction relative to the target.

8. The invention set forth in claim 7, wherein the main plasma gun has an anode and a cathode, the means for providing a transfer arc between the main plasma gun and the target includes a first direct current power supply having a positive terminal coupled to the target and a negative terminal coupled to the cathode of the main plasma gun, the clean-up plasma gun has an anode and a cathode,and the means for providing a transfer arc between the clean-up plasma gun and the target includes a second direct current power supply having a negative terminal coupled to the target and a positive terminal coupled to the anode of the clean-up plasma gun.

9. The invention set forth in claim 7, further including a closed chamber having the main plasma gun and the clean-up plasma gun mounted therein, a powder feed mechanism coupled to the main plasma gun, and a vacuum source coupled to the closed chamber.

10. The invention set forth in claim 7, wherein the means for providing a transfer arc between the main plasma gun and the target includes a direct current power supply of given power coupled between the target and main plasma gun, and further including a second direct current power supply of power substantially less than the given power coupled to the main plasma gun to provide a pilot arc.

11. The invention set forth in claim 10, further including a third direct current power supply having a positive terminal coupled to the anode of the main plasma gun and a negative terminal coupled to the cathode of the main plasma gun and a fourth direct current power supply having a positive terminal coupled to the anode of the clean-up plasma gun and a negative terminal coupled to the cathode of the clean-up plasma gun.

12. A method of plasma treating a target with reduced oxides at the target comprising the steps of providing a plasma stream at the target, providing a first transfer arc directed along a first axis at the target in conjunction with the plasma stream, the first transfer arc having a given polarity relative to the target, and providing a second transfer arc directed along a second axis at the target simultaneously with the first transfer arc, the second transfer arc having a polarity opposite the given polarity relative to the target and the first axis intersecting with the second axis at the target.

13. The method of claim 12, including the further step of introducing a metallic material into the plasma stream.

* * * * *